United States Patent
Huertgen et al.

(10) Patent No.: US 7,876,720 B2
(45) Date of Patent: Jan. 25, 2011

(54) METHOD AND CIRCUIT FOR DIFFERENTIAL CLOCK PULSE COMPENSATION BETWEEN TWO CLOCK-PULSE SYSTEMS

(75) Inventors: Frank Huertgen, Düsseldorf (DE); Bernd Schmandt, Wuppertal (DE)

(73) Assignee: Infineon Technologies AG, Neubiberg (DE)

( * ) Notice: Subject to any disclaimer, the term of this patent is extended or adjusted under 35 U.S.C. 154(b) by 1130 days.

(21) Appl. No.: 11/463,506

(22) Filed: Aug. 9, 2006

(65) Prior Publication Data

US 2007/0165678 A1   Jul. 19, 2007

Related U.S. Application Data

(63) Continuation of application No. PCT/DE2005/000207, filed on Feb. 8, 2005.

(30) Foreign Application Priority Data

Feb. 10, 2004 (DE) ......................... 10 2004 006 510

(51) Int. Cl.
*H04J 3/06* (2006.01)
(52) U.S. Cl. .................. 370/315; 370/350; 370/516; 370/352; 370/465; 375/354; 455/41.2; 455/265; 707/610; 707/611; 707/613; 707/617; 709/248
(58) Field of Classification Search .............. 370/350, 370/352, 465, 516; 375/354; 455/41.2, 265; 707/610, 611, 613, 617; 709/248
See application file for complete search history.

(56) References Cited

U.S. PATENT DOCUMENTS

| 6,400,683 B1 | 6/2002 | Jay et al. | 370/229 |
| 6,456,702 B2 | 9/2002 | Nishihara | 379/93.05 |
| 2001/0014924 A1* | 8/2001 | Nishihara | 710/52 |
| 2002/0101842 A1 | 8/2002 | Harrison et al. | 370/338 |
| 2002/0151275 A1* | 10/2002 | Trost et al. | 455/41 |
| 2002/0159419 A1 | 10/2002 | Morris | 370/338 |
| 2002/0163932 A1* | 11/2002 | Fischer et al. | 370/465 |
| 2002/0181633 A1* | 12/2002 | Trans | 375/354 |
| 2004/0008661 A1* | 1/2004 | Myles et al. | 370/350 |

(Continued)

FOREIGN PATENT DOCUMENTS

EP   1185013 A2   3/2002

(Continued)

OTHER PUBLICATIONS

Tietze et al. "Halbleiter-Schlatungstechnik" Springer Verlag, 12th Ed. (pp. 723-725).

(Continued)

*Primary Examiner*—Vincent P Harper
*Assistant Examiner*—Khalid Shaheed
(74) *Attorney, Agent, or Firm*—Dicke, Billig & Czaja, PLLC

(57) ABSTRACT

A differential clock pulse compensation is performed between the clock-pulse system (23) of a digital line-connected data interface and the asynchronous clock-pulse system (22) of a digital wireless data interface. A characteristic variable (20, 21) for the asynchronous differential clock pulse between the clock-pulse systems (22, 23) is monitored hereby. The data rate of the data (15, 16) transmitted over the line-connected data interface is adapted depending on the characteristic variable (20, 21).

34 Claims, 5 Drawing Sheets

U.S. PATENT DOCUMENTS

2004/0014423 A1* 1/2004 Croome et al. ............. 455/41.2
2004/0014924 A1* 1/2004 Nowak et al. ................ 528/28
2004/0109441 A1* 6/2004 Hur et al. .................... 370/352

FOREIGN PATENT DOCUMENTS

WO 99/59279 A1 11/1999
WO 2005/076123 A1 8/2005

OTHER PUBLICATIONS

"Bluetooth Specification" Version 1.1 (pp. 543-560), Feb. 22, 2001.
International Search Report for International Application No. PCT/DE2005/000207 (7 pages), Apr. 22, 2005.
International Preliminary Examination Report for International Application No. PCT/DE2005/000207 (22 pages), Feb. 6, 2006.

* cited by examiner

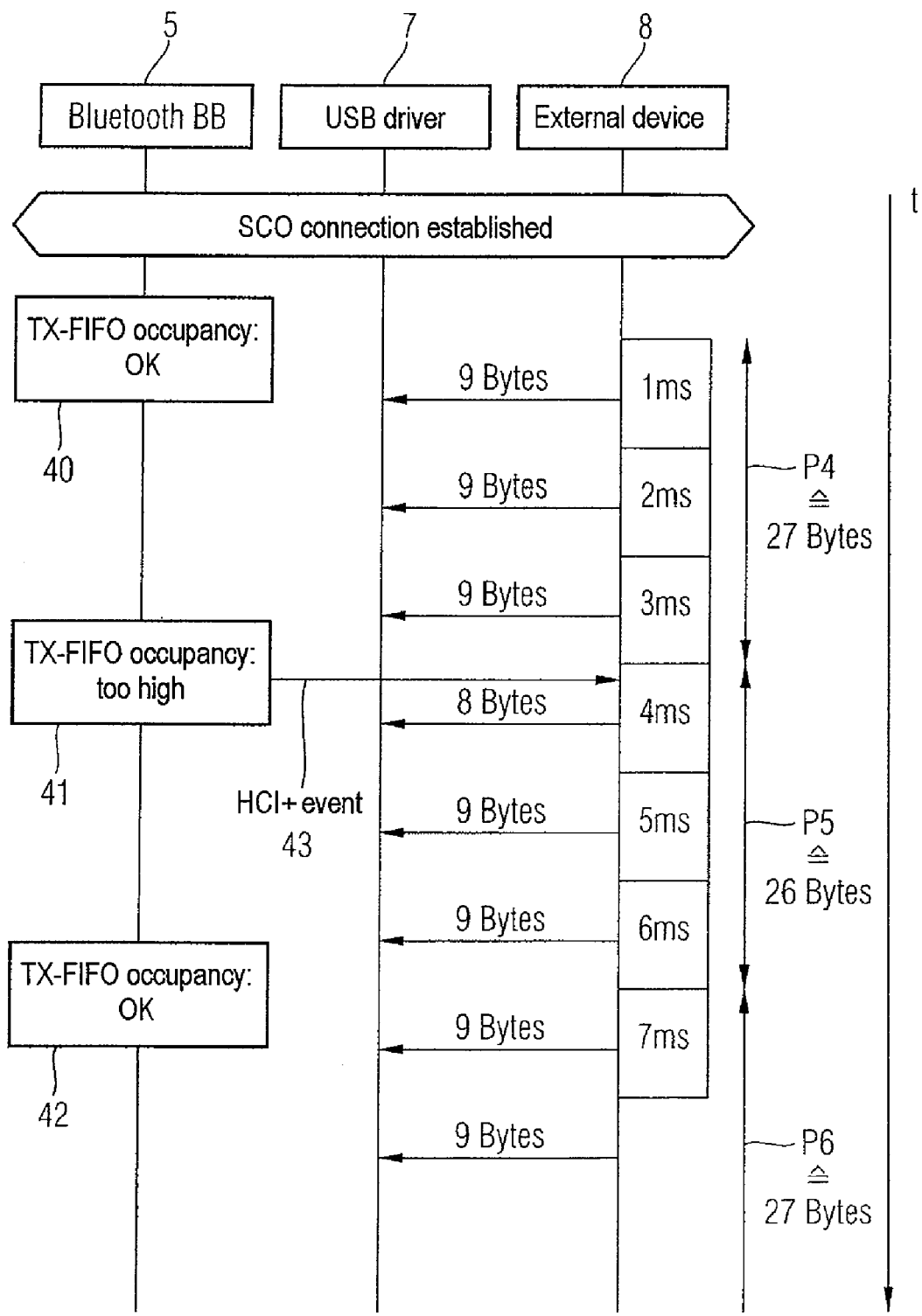

METHOD AND CIRCUIT FOR DIFFERENTIAL CLOCK PULSE COMPENSATION BETWEEN TWO CLOCK-PULSE SYSTEMS

CROSS-REFERENCE TO RELATED APPLICATION

This application is a continuation of co-pending International Application No. PCT/DE2005/000207 filed Feb. 8, 2005, which designates the United States, and claims priority to German application number DE 10 2004 006 510.1 filed Feb. 10, 2004.

TECHNICAL FIELD

The invention relates to a method for differential clock pulse compensation between the clock-pulse system of a digital line-connected data interface and the asynchronous clock-pulse system of a digital wireless data interface. The invention also relates to a corresponding circuit.

BACKGROUND

If data is received or sent over a wireless data interface, such as over an interface based on the Bluetooth standard for example, it is often the case that said data must also be previously or subsequently transmitted over a line-connected data interface, such as a USB interface (USB—Universal Serial Bus) for example. In general there are two different clock-pulse systems operating within said transmission chain formed by the wireless and the line-connected data interfaces. The clock rate of the wireless data interface is determined by one of at least two radio transceiver devices assigned to the data interface. On the other hand, the clock rate of the line-connected data interface is frequently predetermined by the external clock rate of a data processing device connected over the line-connected data interface to a radio transceiver device. In the case of Bluetooth, the clock rate of the wireless data interface is determined by the clock supply of the Bluetooth-specific BT master (BT=Bluetooth), while the clock rate of the BT slave is synchronized with the clock rate of the BT master by injecting a phase and frequency offset. Analogously, in the case of the line-connected USB interface, the USB-specific USB master determines the clock rate of the USB interface. If a radio transceiver device is connected over a USB interface to, for example, a data processing device, for example a laptop, as USB master the data processing device generally determines the clock rate of the USB interface. If, as in the present case, the clock-pulse systems of the two interfaces are mutually independent, this results in a slightly different data rate or processing speed of the data at the two interfaces, although the nominal data rates are the same. Without special measures, if the data sequence is long enough, this can result in the data sent by the original sender (line-connected or wireless) of such a transmission chain not matching the data received by the final receiver (line-connected or wireless) of such a transmission chain. Either some transmitted data elements are missing, or additional data elements that were not sent are present at the receiver.

In principle it is possible to transmit data via synchronous channels or asynchronous channels over digital wireless data interfaces. In contrast to asynchronous channels, in the case of synchronous channels, fixed time slots are reserved for the transmission. Synchronous channels are therefore used for transmitting time-critical information, such as for voice transmission for example, while asynchronous channels are used for batch-type data traffic. In the Bluetooth standard, synchronous channels are referred to as SCO channels (SCO=synchronous connection-oriented) and asynchronous channels are referred to as ACL channels (ACL=asynchronous connectionless).

In principle the data to be transmitted over a digital wireless data interface can be divided into two categories: the first category comprises the so-called transparent data for the wireless data interface. With transparent data, the components of the wireless data interface have no knowledge of the information content of the data, that is to say from the point of view of the radio components the data is just a non-interpretable string of zeros and ones to be transmitted over the data interface. Transparent data is, for example, the digital data of a WAV file (WAV stands for wave) of a piece of music, where the underlying structure or encoding of a WAV file is not known to the Bluetooth interface.

This is distinct from the non-transparent data from the point of view of the wireless data interface. With such data, the data interface has knowledge of the information content of the data. For example, non-transparent data is special voice-encoded data which is present in an encoding format ($\mu$-law log PCM, A-law log PCM or CVSD) supported by the Bluetooth standard.

During the transmission of data over an asynchronous channel of a wireless data interface and additionally over a line-connected data interface, the asynchronous differential clock pulse of the two clock-pulse systems does not present a problem because the data traffic occurs only in batches. If, on the other hand, a synchronous channel of a wireless data interface is used in such a transmission chain, where the data is transmitted continuously over the transmission chain, transmission errors as described above are inevitable unless suitable compensation measures are taken. Such transmission errors can only be tolerated for unencoded linear data. As a countermeasure, a FIFO ring memory (FIFO=First In First Out) can be used as a data buffer at the interface between a first and an asynchronous second clock-pulse system. Said FIFO ring memory is clocked both by a clock-pulse signal of the clock-pulse system of the wireless data interface and by a clock-pulse signal of the clock-pulse system of the line-connected data interface. The occupancy level, that is to say the number of data elements stored, of such a FIFO ring memory indicates whether too little or too much data has been transmitted as a result of the asynchronous differential clock pulse. Using an appropriate algorithm, the number of data elements in the FIFO ring memory can be increased or decreased by means of interpolation. The disadvantage of such a solution is that the interpolation cannot be performed in a radio transceiver device, i.e. the mobile communications chip, during transmission of transparent data over the wireless data interface, since said device has no knowledge of the information content of the transmitted data. For error-free transmission of transparent data without a corresponding interpolation at the terminal device, it is therefore necessary to prevent two mutually asynchronous clock-pulse systems operating in the transmission chain.

SUMMARY

A method for differential clock pulse compensation between the clock-pulse system of a digital line-connected data interface and the asynchronous clock-pulse system of a digital wireless data interface may ensure that the transition of the data, especially transparent data, between two clock-pulse systems does not cause any data errors. A method for differential clock pulse compensation between a clock-pulse system of a digital line-connected data interface and an asynchronous clock-pulse system of a digital wireless data interface, wherein user data which is sent over the wireless data interface in a synchronous mode of the wireless data interface is transmitted over the line-connected data interface in a packet-based manner, may comprising the steps of:
(1) monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and
(2) adapting the data rate of the data transmitted over the line-connected data interface depending on the occupancy level of the memory, in that the number of data elements in a data packet is increased if the occupancy level is below a permitted limit, and the number of data elements in a data packet is reduced if the occupancy level is above a permitted limit.

BRIEF DESCRIPTION OF THE DRAWINGS

The invention will be explained in greater detail below in relation to an exemplary embodiment with reference to the drawings, in which:

FIG. 3a shows a flowchart of the adaptation according to one embodiment of the data rate of the USB interface when a given occupancy level of a FIFO ring memory is exceeded, wherein the data is transmitted in the direction of the Bluetooth interface.

DETAILED DESCRIPTION

Figure 1:
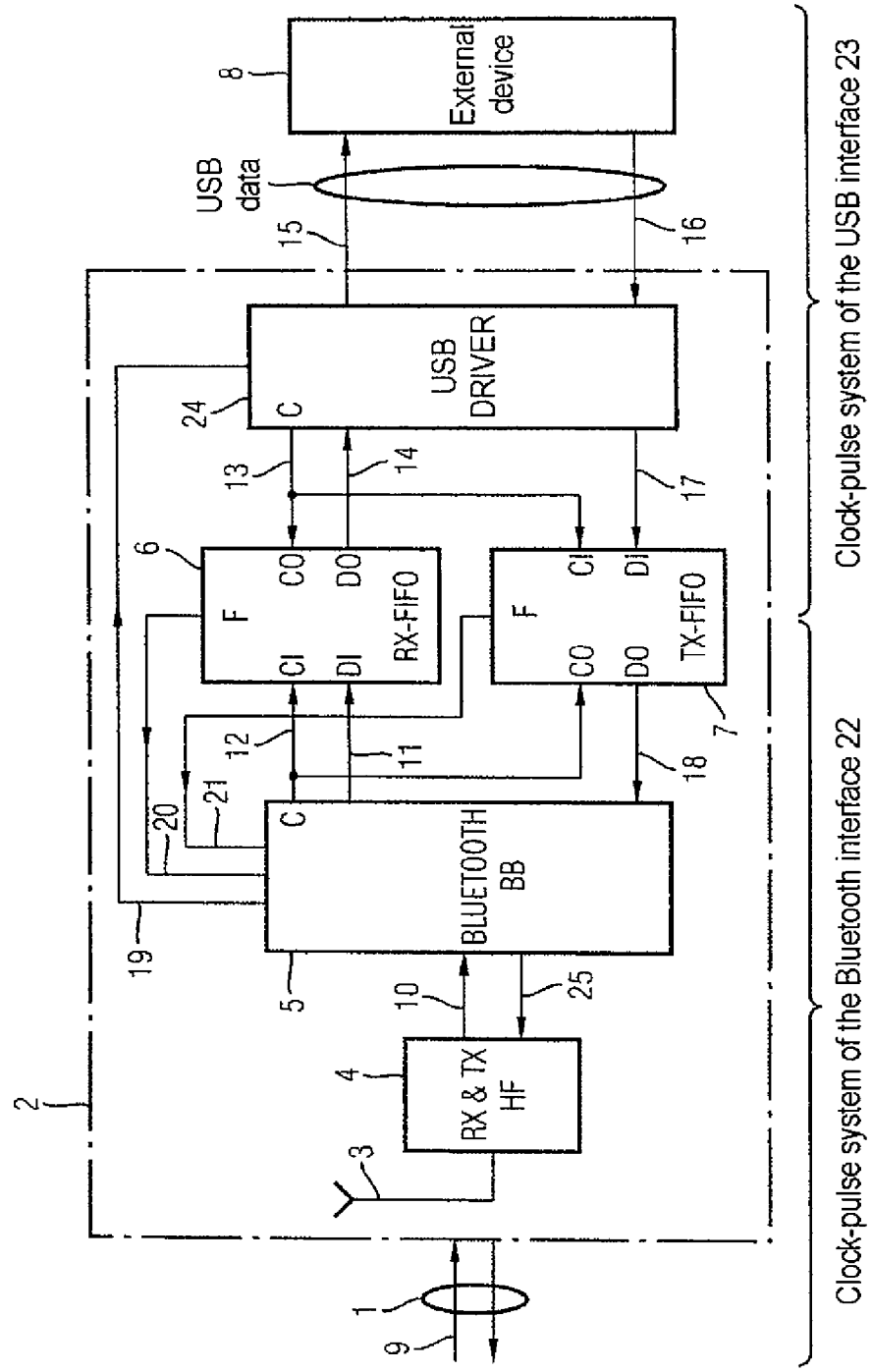
FIG. 1 shows a representation of a transmission of data sent or received over a Bluetooth interface between a Bluetooth transceiver device and an external device over a USB interface.

The method step 2) may comprise the step of sending of a first control signal depending on the occupancy level over the line-connected data interface to a data processing device connected to the radio device over the line-connected data interface, which signal instructs the data processing device to increase or to decrease the data rate of the data transmitted from the data processing device to the radio device. The first control signal may instruct the data processing device to increase or to decrease the number of data elements in a data packet, in particular by one data element.

In another embodiment, a method for differential clock pulse compensation between a clock-pulse system of a digital line-connected data interface and an asynchronous clock-pulse system of a digital wireless data interface, wherein user data which is received over the wireless data interface in a synchronous mode of the wireless data interface is transmitted over the line-connected data interface in a packet-based manner, may comprise the steps of:
(1) monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and
(2) adapting the data rate of the data transmitted over the line-connected data interface depending on the occupancy level of the memory, in that the number of data elements in a data packet is reduced if the occupancy level is below a permitted limit, and the number of data elements in a data packet is increased if the occupancy level is above a permitted limit.

The method step 2) may comprise the step of transferring a second control signal for controlling the line-connected data interface to a driver circuit on the radio device side, which signal instructs the driver circuit on the radio device side to increase or to decrease the data rate of the data transmitted from the radio device to the data processing device. The second control signal may instruct the driver circuit on the radio device side to increase or to decrease the number of data elements in a data packet, in particular by one data element. The user data may be user data about which a radio device assigned to the wireless data interface has no knowledge with respect to the information content of the user data, in particular about an encoding used for the user data. The wireless data interface may operate in conformity with the Bluetooth standard. The first control signal may be based on a Bluetooth-specific HCI event, and wherein the method step 2) comprises the step of sending of a first control signal depending on the occupancy level over the line-connected data interface to a data processing device connected to the radio device over the line-connected data interface, which signal instructs the data processing device to increase or to decrease the data rate of the data transmitted from the data processing device to the radio device. The line-connected data interface may operate in conformity with the USB standard. The method may further comprise the step of interpolating the data received or to be sent in the data processing device.

The method according to one embodiment serves for differential clock pulse compensation between the clock-pulse system of a digital line-connected data interface and the asynchronous clock-pulse system of a digital wireless data interface. This assumes that user data which is received or sent over the wireless data interface in the synchronous mode of the wireless data interface is also transmitted over the line-connected data interface. The method according to one embodiment is divided into two steps: in a first step a characteristic variable for the asynchronous differential clock pulse between the clock-pulse system of the line-connected data interface and the clock-pulse system of the wireless data interface is monitored. In a second step the data rate of the data transmitted over the line-connected data interface is adapted depending on the characteristic variable.

By virtue of the control according to one embodiment of the data rate of the line-connected data interface, it is ensured that no data error is generated at the interface between the two clock-pulse systems itself despite the presence of an asynchronous differential clock pulse between the two asynchronous clock-pulse systems, since the data rates of the two data interfaces now correspond to one another, despite having a mutually asynchronous clock rate. As a result, an error-free transmission of the data over the synchronous channel of the wireless connection remains ensured. Moreover, the data rate of the synchronous wireless connection is not affected by the method according to one embodiment. This is particularly advantageous whenever—as is the case with a Bluetooth interface—the data rate of the wireless interface cannot be modified owing to a standard-specific restriction. In the case of a Bluetooth interface, the data rate of a synchronous connection is always predetermined to be 64 kbit/s. It should be noted that the asynchronous differential clock pulse becomes evident at the terminal devices of a transmission chain. This is because the data processing rate of the terminal devices is not affected by the method according to one embodiment. However, since said devices always have knowledge of the encoding of the data as signal source or sink respectively, that is to say the data is not transparent for the terminal devices, it is possible to perform interpolation of the data there. The method according to one embodiment thus ensures an error-free and, from the point of view of the wireless interface, synchronous transmission over the wireless data interface, wherein the asynchronous differential clock pulse no longer has an impact between the wireless and the line-connected data interface, but rather is only evident at the signal source or sink respectively, and can be readily compensated at this point.

The solution according to one embodiment requires that the external system which is connected to a transceiver device over a line-connected interface, and/or the driver of the line-connected interface situated on the transceiver device side, can be instructed by means of appropriate control signals or commands to adapt the data rate of the line-connected interface.

The characteristic variable may also be a plurality of variables, or according to one embodiment a plurality of characteristic variables may be used.

In principle it is also conceivable to adapt the data rate of the wireless data interface instead of—as proposed according to one embodiment—the data rate of the line-connected data interface. The disadvantage of such a solution is however that the ability to alter the data rate of the wireless data interface during synchronous operation of the interface is not usually supported by the standard. In particular, a Bluetooth interface does not support adapting the data rate of a synchronous SCO connection.

In the application the term "asynchronous differential clock pulse" is understood to refer only to the part of the difference between two clock rates that produces a different user data rate of the two data interfaces, and consequently prevents a synchronous data transport over the two data interfaces operated one after the other in series. It is in principle conceivable for different clock frequencies to be present at the two interfaces, but this does not lead to an asynchronous differential clock pulse within the meaning of the application. For instance, frequency multiples may be present as a result of parallel or serial data transmission, or the clock frequency is not the same owing to a different number of header data elements of the two data interfaces. In both cases the asynchronous differential clock pulse is zero for the same user data rate.

It is particularly advantageous if the user data is user data about which a radio device assigned to the wireless data interface has no knowledge with respect to the information content of the user data, in particular about an encoding used for the user data. The method according to one embodiment enables such transparent data with respect to the wireless interface to be transmitted error-free over a transmission link, wherein two clock-pulse systems in the transmission link may be mutually asynchronous.

Control signals are advantageously sent for adapting the data rate of the data transmitted over the line-connected data interface. Using said control signals, the data rate of the line-connected data interface, in particular for a packet-based line-connected data interface, can be adapted by increasing or decreasing the number of data elements per data packet.

If the data is transmitted in this case over the line-connected data interface in the direction of the wireless data interface, depending on the characteristic variable, a first control signal is sent over the line-connected data interface to a data processing device connected to the radio device over the line-connected data interface. Said first control signal instructs the data processing device to increase or to decrease the data rate of the data transmitted from the data processing device to the radio device. It is advantageous here if the data is transmitted in packet-based mode over the line-connected data interface, and the first control signal instructs the data processing device to increase or to decrease the number of data elements in a data packet—in particular by one data element. A data packet may be defined here also as data packet per unit of time, for example per millisecond.

If, on the other hand, the data is transmitted over the data interface against the direction of the wireless data interface, a second control signal for controlling the line-connected data interface is transferred to a driver circuit on the radio device side. Said second control signal instructs the driver circuit on the radio device side to increase or to decrease the data rate of the data transmitted from the radio device to the data processing device. It is advantageous here if, analogously to the opposite direction, the data is transmitted in packet-based mode over the line-connected data interface. In this case the second control signal instructs the driver circuit on the radio device side to increase or to decrease the number of data elements in a data packet—in particular by one data element. Here, too, a data packet may also be defined as data packet per unit of time, for example per millisecond.

By increasing or decreasing only the number of data elements in a data packet in the case of packet-based line-connected interfaces, it is readily possible to alter the data rate of the line-connected interface without altering the clock rate of said interface. If the number of data elements per packet is altered only by one data element, the asynchronous differential clock pulse can be compensated with a high degree of precision. If the asynchronous differential clock pulse is relatively high, it is necessary to successively transmit a plurality of packets having a packet length that has been altered from the nominal packet length. For instance, a data element may be one bit, one byte, or a polyvalent symbol. The prerequisite for this solution is that the maximum packet size that can be transmitted is at least one data element, e.g. 1 byte, larger than the nominal packet size.

It is advantageous if the occupancy level of at least one FIFO ring memory arranged between the wireless data interface and the line-connected data interface is monitored. As a data buffer said FIFO ring memory admits the user data for temporary storage, and is clocked both by a clock-pulse signal of the clock-pulse system of the wireless data interface and by a clock-pulse signal of the clock-pulse system of the line-connected data interface. FIFO ring memories are used in the prior art for linking asynchronous systems. The basic operation of FIFO memories and especially FIFO ring memories is described in the textbook "Halbleiter-Schaltungstechnik" (*Semiconductor Circuitry*) by U. Tietze and Ch. Schenk, Springer-Verlag, 12th edition, pages 723-725, chapter 10.2.3. The aforesaid text passage is hereby included by reference in the information disclosed in the description. In the case of bi-directional data interfaces, one FIFO ring memory should be provided for each of the two transmission directions. It is however also conceivable to use just one FIFO ring memory which is used in time-division multiplex mode for both transmission directions. If data starting from the wireless data interface is transmitted over the line-connected data interface, the read-in clock rate of the FIFO ring memory assigned to said transmission direction corresponds to the clock-pulse signal of the clock-pulse system of the wireless data interface. The read-out clock rate of said FIFO ring memory corresponds to the clock-pulse signal of the clock-pulse system of the line-connected data interface. If the data flow is in the opposite direction, the clock rate assignment of the FIFO ring memory assigned to said transmission direction is exactly the opposite. In principle it is also possible within the meaning of the invention to provide any FIFO memory, in particular a FIFO shift register, instead of a FIFO ring memory. However, in comparison with a FIFO shift register, a FIFO ring memory based on a RAM memory block offers a number of advantages not described more fully here.

The wireless data interface advantageously operates in conformity with the Bluetooth standard. In this case it is advantageous if the first control signal is based on a Bluetooth-specific HCI event (HCI=Host Controller Interface). One or more HCI events may be used for control purposes.

The HCI is an interface on a higher protocol layer, i.e. not a physical interface, between the Bluetooth transceiver device and the data processing device, also referred to as host, connected to the Bluetooth hardware over a line-connected interface. The HCI supports various types of physical line-connected data interfaces here, for example USB, RS232 or UART (Universal Asynchronous Receiver and Transmitter). The basic operation of the HCI is described in the Bluetooth specification, version 1.1, pages 543 to 559. Said text passage is hereby included by reference in the information disclosed in the description. Provided for the HCI are special HCI events which are transmitted in so-called HCI event packets, by means of which the host can be informed about certain events by the Bluetooth hardware. According to one embodiment, said HCI events are suitable for controlling the data rate of the line-connected data interface when data is transmitted from the host to the Bluetooth transceiver device. Using such an HCI event, the Bluetooth hardware can define how many synchronous data elements the host should send at the next synchronous time point. Since special HCI events with which the data rate of the line-connected data interface can be controlled are not yet specified in the Bluetooth standard, according to one embodiment one or more special manufacturer-specific HCI events, so-called HCI+ events, are defined for this purpose, by means of which the data rate sent by the host over the line-connected data interface can be adapted to the clock rate of the Bluetooth radio interface.

It is advantageous in this case if the line-connected data interface operates in conformity with the USB standard. As a result, firstly the user data can be transmitted between the Bluetooth hardware and the host by means of so-called HCI data packets, and secondly HCI events can be used to adapt the data rate of the data transmitted by the host over the line-connected data interface. HCI data packets serve in the HCI to exchange data between the host and the Bluetooth hardware. In contrast to HCI event packets, HCI data packets can be transmitted both by the Bluetooth hardware and by the host.

According to one advantageous development of the method, it is provided that the data received or to be sent is interpolated in the data processing device. The asynchronous differential clock pulse always has an effect—as already described above—at the terminal devices of a transmission chain. However, since said devices always have knowledge of the encoding of the data as signal source or sink respectively, it is possible to perform interpolation of the data there. In the case of receiving, the interpolation is performed on the basis of certain sequences of data elements or regularities between the data elements resulting from the encoding of the data which are expected by the terminal device.

The circuit according to one embodiment serves for differential clock pulse compensation between the clock-pulse system of a digital line-connected data interface and the asynchronous clock-pulse system of a digital wireless data interface. This assumes that user data which is received or sent over the wireless data interface in the synchronous mode of the wireless data interface is also transmitted over the line-connected digital data interface. The circuit according to one embodiment comprises a means for monitoring a characteristic variable for the asynchronous differential clock pulse between the clock-pulse system of the line-connected data interface and the clock-pulse system of the wired data interface. In addition, a means for adapting the data rate of the data transmitted over the line-connected data interface is provided in the circuit according to one embodiment, which means performs the adaptation depending on the characteristic variable.

FIG. 1 shows a transmission of data sent or received over a Bluetooth interface between a Bluetooth transceiver device 2 and an external device 8 over a USB interface. Data is sent or received bidirectionally by the Bluetooth transceiver device 2 over a Bluetooth channel 1. The device 2 comprises an antenna, a high-frequency circuit 4, a Bluetooth baseband circuit 5, two FIFO ring memories 6 and 7, as well as a USB driver circuit 24 on the radio device side. The Bluetooth transceiver device 2 is connected to an external device 8, for example to a laptop, over a bi-directional USB interface. In the text below, the direction of data flow starting from the Bluetooth interface toward the external device 8 will be referred to as the RX direction, and the opposite direction of data flow will be referred to as the TX direction.

In the high-frequency circuit 4, data 9 received over the synchronous Bluetooth SCO channel 1 in the RX direction is mixed into the baseband. The received baseband signal 10 is converted into a digital signal in the baseband circuit 5 by means of an analog/digital converter (not shown). Following digital processing, the processed data signal 11 is read into a first FIFO ring memory 6 which is assigned to the RX direction. The clock rate 12 for reading in the data is derived from the clock-pulse system of the Bluetooth interface 22. The clock rate of the wireless data interface is determined by the clock supply of the BT master, while the clock rate of the BT slave is synchronized with the clock rate of the BT master by injecting a phase and frequency offset. The reading of the data out of the first FIFO ring memory 6 is controlled by a clock-pulse signal 13 supplied by the USB driver 24. Said clock-pulse signal 13 is derived from the clock-pulse system of the USB interface 23. Since the USB driver 24 acts as a USB slave, the clock-pulse signal 13 and the clock-pulse system of the USB interface are therefore determined by the external device 8 which is operating as USB master. The asynchronous differential clock pulse of the asynchronous clock-pulse signals 12 and 13 causes the occupancy level of the first FIFO ring memory 6 (and also of the second FIFO ring memory 7) to either increase or decrease. If the asynchronous differential clock pulse of the clock-pulse signals 11 and 13 is zero, the occupancy level of the first FIFO ring memory 6 remains constant. The output signal of the first FIFO ring memory 6 is supplied to the USB driver 24 at the clock rate of the clock-pulse signal 13, which driver generates from the data signal 14 a USB-compliant data signal 15 which is transmitted to the external device 8 over a USB-compliant line connection. Such a USB signal 15 is transmitted as a differential signal over a plurality of parallel conductors.

In the TX direction a USB data signal 16 is transmitted from the external device 8 to the USB driver circuit 24 over a line connection. In this case both USB signals 15 and 16 are transported over the same bi-directional USB line connection. The received signal 17 is then supplied to the second FIFO ring memory 7, the read-in clock rate of which corresponds to the clock-pulse signal 13 of the clock-pulse system 23 of the USB interface. The second FIFO ring memory 7 of the TX direction is identical to the first FIFO ring memory 6 of the RX direction. The data is read out of the second FIFO ring memory 7 at the clock rate of the clock-pulse signal 12 of the clock-pulse system 22 of the Bluetooth interface. The data signal 18 read out is supplied to the baseband circuit, which generates a channel-encoded Bluetooth baseband signal 25 which is mixed in the high-frequency circuit 4 onto a carrier frequency and is transmitted over the Bluetooth channel 1.

The intention of one embodiment is to prevent errors occurring during the data transfer between the clock-pulse system of the Bluetooth interface and the independent clock-pulse system of the USB interface. In particular this can occur if fixed packet sizes are transmitted by the external device 8, the USB master, at fixed times determined by the clock-pulse system of the USB interface. To avoid errors, the data rate of the USB connection is adapted to the data rate of the synchronous Bluetooth connection. It is provided that the Bluetooth transceiver device 2 can control the data rate at the USB interface using a special protocol. In the TX direction, therefore, provision is made for special HCI+ events to be transmitted to the external device 8 over the USB interface, which events instruct the external device 8 to adapt the data rate of the signals transmitted over the USB interface in the TX direction. In the RX direction, an internal control signal 19 is used to adapt the data rate, which signal instructs the USB driver 24 to adapt the data rate of the signals transmitted over the USB interface in the RX direction. In order to trigger the internal signal 19 or corresponding HCI+ events transmitted over the USB interface, according to one embodiment the occupancy level of the FIFO ring memories 6 and 7 respectively are monitored. The signals 20 and 21 of the first FIFO ring memory 6 or of the second FIFO ring memory 7 respectively which describe the occupancy level of the respective FIFO ring memory serve for this purpose. Said signals are supplied to the baseband circuit 5, which performs the monitoring of the occupancy level. If the current occupancy level of a ring memory 6 or 7 exceeds a previously defined tolerance range, the control signal 19 or a corresponding HCI+ event respectively is triggered by the baseband circuit. If the occupancy level is too high, the control signal 19 causes more data elements, and if the occupancy level is too low it causes fewer data elements to be read out of the first ring memory 6 for the next data packet by the USB driver 13, so that the occupancy level is again adapted or adjusted to an admissible level. Conversely, if the occupancy level is too high, an HCI+ event (not explicitly illustrated) transmitted as control signal over the USB interface causes the external device 8 to transmit fewer data elements, and if the occupancy level is too low it causes more data elements to be transmitted in the next data packet over the USB interface in the direction of the second ring memory 7. In this case, too, the occupancy level is again adapted to an admissible level. By virtue of the measures according to one embodiment, therefore, the occupancy level is regulated to an admissible level.

Figure 2A:
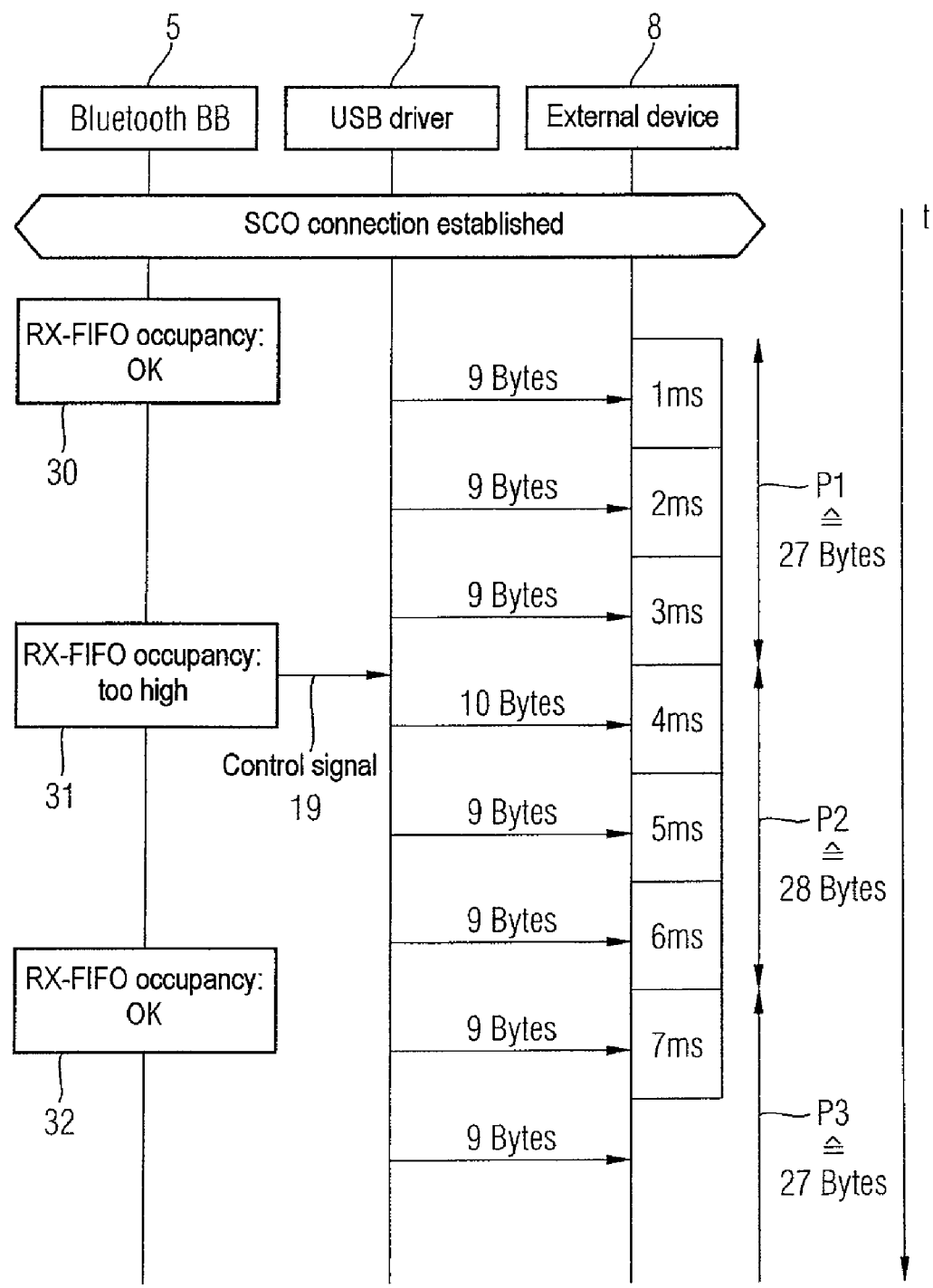
FIG. 2a shows a flowchart of the adaptation according to one embodiment of the data rate of the USB interface when a given occupancy level of a FIFO ring memory is exceeded, wherein the data is transmitted against the direction of the Bluetooth interface.

FIG. 2a illustrates in a flowchart with reference to a concrete example the adaptation according to one embodiment of the data rate of the USB interface in the RX direction when a given occupancy level of the first FIFO ring memory 6 is exceeded. The elements in the drawings according to FIG. 1 and FIG. 2a having the same reference symbols correspond to one another. The flowchart illustrates side-by-side the actions of the baseband circuit 5, of the USB driver 24 on the radio device side and of the external device 8, with the time sequence running from the top to the bottom.

The example assumes a Bluetooth transmission of transparent data over a synchronous SCO channel having a user data rate of 64 kbit/s. The data received in the transceiver device 2 (cf. FIG. 1) must be transmitted synchronously over the USB interface to the external device 8 at 8 bytes user data per second. Provided for the HCI are special HCI data packets, so-called HCI SCO data packets, by means of which synchronous data exchange can take place between a Bluetooth transceiver device and a host, i.e. an external device 8. In the present example, HCI SCO data packets having a nominal packet length of 27 bytes are assumed for the data transmission of the received data to the external device 8. Such HCI SCO data packets always have a header of 3 bytes, i.e. only 24 bytes are available for user data in a data packet 27 bytes long. HCI data packets allow for a variable number of user data elements to be selected. In particular it is also possible to transfer, instead of a packet having a nominal total length of 27 bytes (24 bytes user data), a packet having a total length of 26 bytes (23 bytes user data) or having a total length of 28 bytes (25 bytes user data). For the nominal transmission of 8 bytes user data per second to the external device 8, therefore, a total of 9 bytes per second must be transmitted. Accordingly, FIG. 2a shows that the USB driver 24 nominally transmits a total of 9 bytes data per millisecond to the external device 8. At the same time as this the baseband circuit 5 checks at regular intervals whether the occupancy level of the first FIFO ring memory 6 is within permitted limits. During a first check 30 of the occupancy level of the first ring memory 6 it is found that the occupancy level is correctly within the permitted limits. Three times 9 bytes per millisecond, that is to say a total of 27 bytes, are therefore transmitted in the first HCI SCO data packet P1. The millisecond frame shown in FIG. 2a is generated depending on the clock rate of the external device 8, that is to say of the USB master. Said clock rate is independent of the clock rate of the Bluetooth interface, that is to say the two clock rates are mutually asynchronous. As a result, despite the Bluetooth interface and the USB interface having nominally the same user data rate, the occupancy level of the ring memory 6 decreases or increases over time. If the clock rate of the Bluetooth interface is slightly higher than the clock rate of the USB interface, the occupancy level of the ring memory 6 increases over time. In the opposite case, the occupancy level of the ring memory decreases over time. During the second check 31 of the occupancy level the baseband circuit 5 finds that the occupancy level is too high, that is to say is outside the permitted limits. The baseband circuit 5 responds to this by instructing the USB driver 24 by means of the control signal 19 to transfer more than the nominal 24 bytes user data in the next HCI SCO data packet P2. The second packet P2 therefore has a total length of 28 bytes (25 bytes user data), with firstly 10 bytes and then two times 9 bytes total data per millisecond being transmitted during the transmission of the second HCI SCO data packet P2. During the third check 32 of the occupancy level the baseband circuit again finds that the occupancy level is again correctly within the permitted limits. This is because, for a brief period during the transmission of the second packet P2, more user data was transmitted over the USB interface and read out of the first ring memory 6 than was transmitted by the Bluetooth interface and read into the first ring memory 6 during this period. The initially too high occupancy level of the first ring memory 6 was thus reduced. The third packet P3 is therefore again transmitted with the nominal length of 27 bytes total length.

Figure 2B:
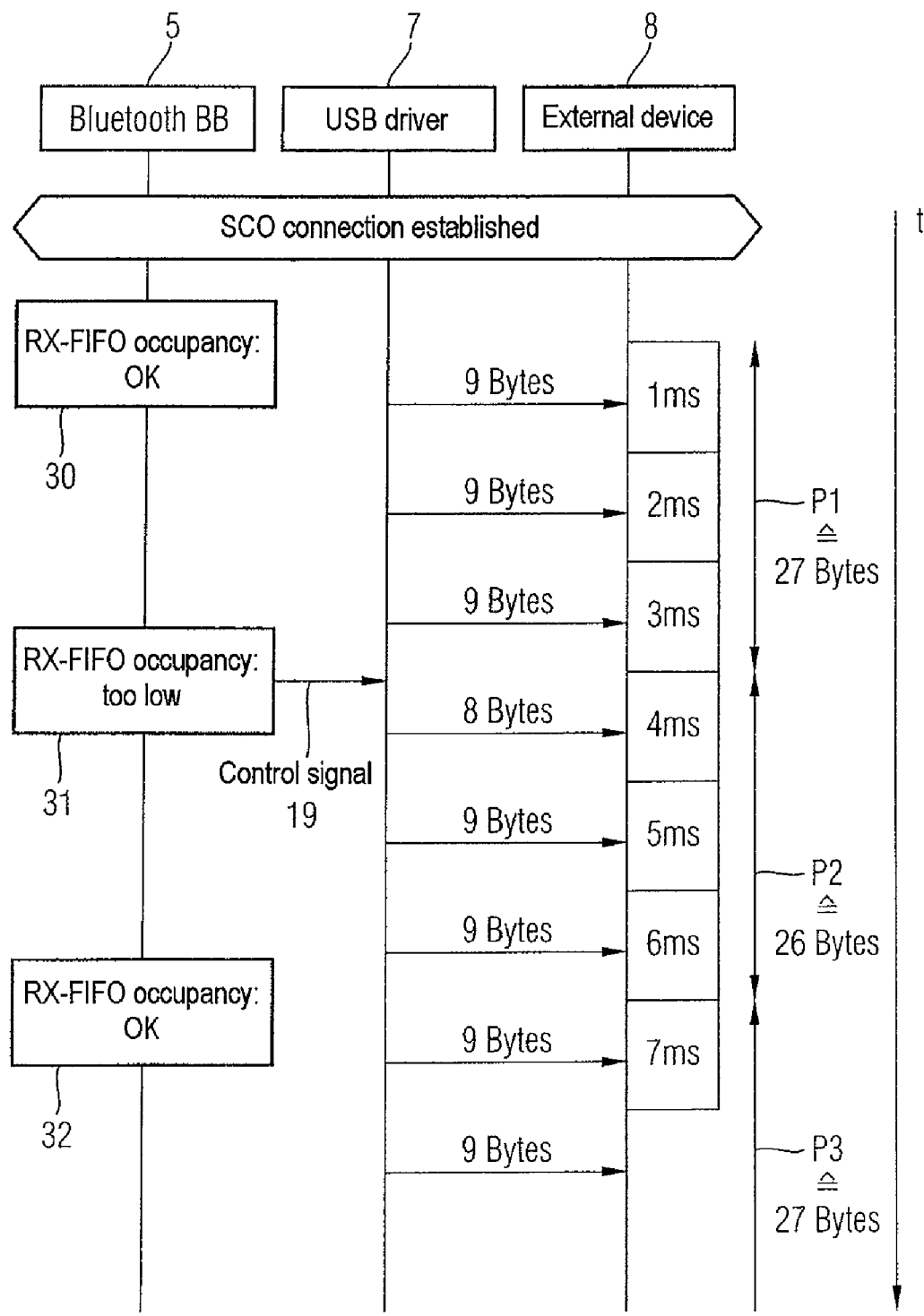
FIG. 2b shows a flowchart of the adaptation according to one embodiment of the data rate of the USB interface when a given occupancy level of a FIFO ring memory is not attained, wherein the data is transmitted against the direction of the Bluetooth interface.

FIG. 2b shows a flowchart of the method if a given occupancy level of the FIFO ring memory 6 is not attained, the conditions being otherwise identical to those in FIG. 2a. The elements in the drawings according to FIG. 2a and FIG. 2b having the same reference symbols correspond to one another. In contrast to the sequence in FIG. 2a, during the second check 31 of the occupancy level of the first ring memory 6 it is found that the occupancy level is too low here. The baseband circuit 5 responds to this by instructing the USB driver 24 by means of the control signal 19 to transfer fewer than the nominal 24 bytes user data in the next HCI SCO data packet P2. The second packet P2 therefore has a total length of 26 bytes (23 bytes user data), with firstly 8 bytes and then two times 9 bytes total data per millisecond being transmitted during the transmission of the second HCI SCO data packet P2. During the third check 32 of the occupancy level the baseband circuit 5 again finds that the occupancy level is again correctly within the permitted limits. This is because, for a brief period less user data was transmitted with the second packet P2 and read out of the first ring memory 6 than was transmitted by the Bluetooth interface and read into the first ring memory 6 during this period. The initially too low occupancy level of the first ring memory 6 was thus increased. The third packet P3 is therefore again transmitted with the nominal total length of 27 bytes.

Figure 3B:
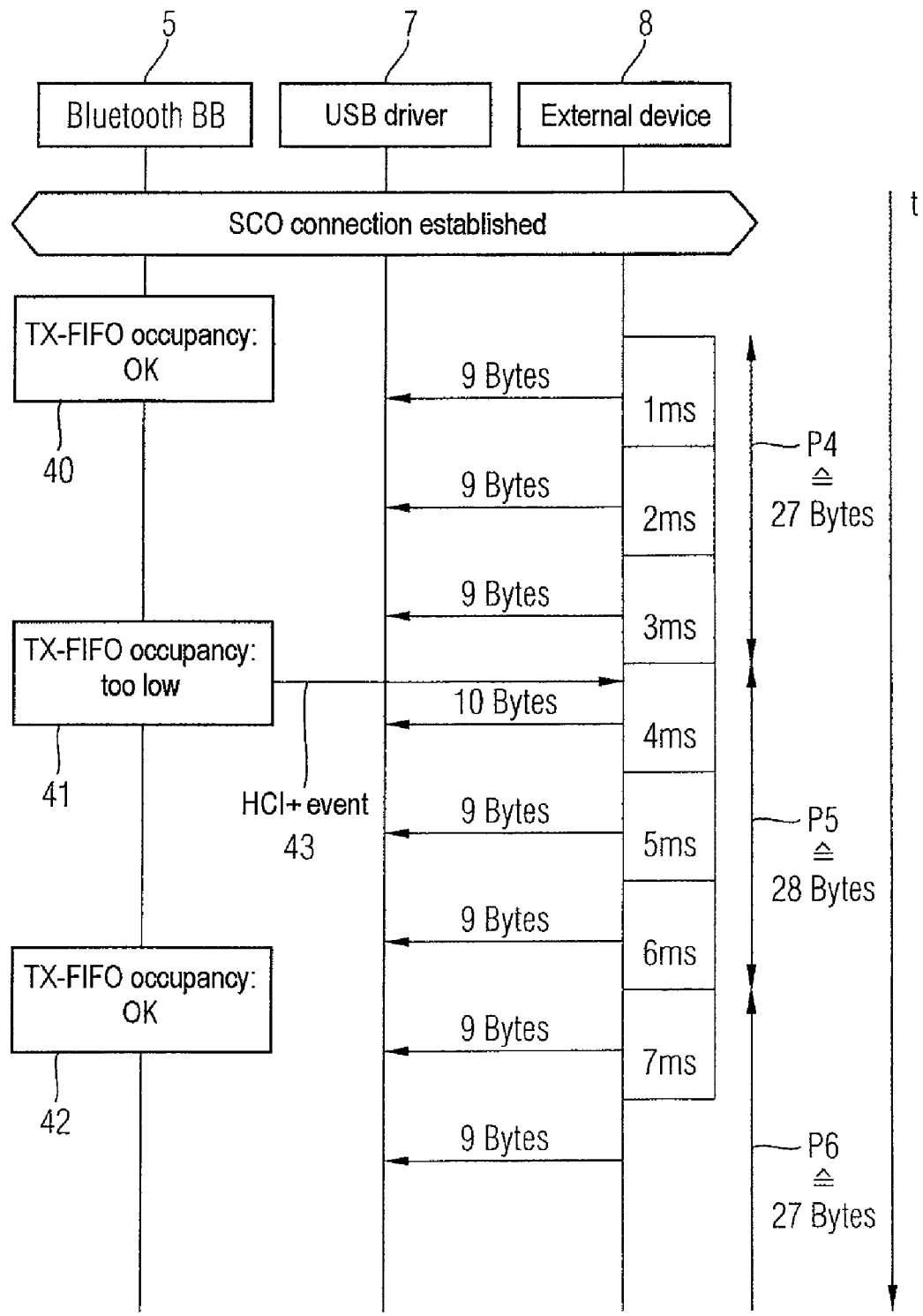
FIG. 3b shows a flowchart of the adaptation according to one embodiment of the data rate of the USB interface when a given occupancy level of a FIFO ring memory is not attained, wherein the data is transmitted in the direction of the Bluetooth interface.

FIG. 3a illustrates in a flowchart with reference to a concrete example the adaptation according to one embodiment of the data rate of the USB interface in the TX direction when a given occupancy level of the second FIFO ring memory 7 is exceeded. Analogously to FIG. 2a and FIG. 2b, an SCO channel with 64 kbit/s is assumed for the transmission of the data over the Bluetooth interface in the TX direction. As in FIG. 2a and FIG. 2b, the data is transmitted from the external device 8 to the USB driver 24 over the USB interface by means of HCI SCO data packets having the same structure as in FIG. 2a and FIG. 2b. The nominal total packet length is 27 bytes per packet (24 bytes user data), i.e. 9 bytes per millisecond. Only the transmission direction of the HCI SCO data packets runs in the opposite direction to the transmission in the RX direction, that is to say from the external device 8 to the baseband circuit 5 via the USB driver 24. In contrast to FIG. 2a and FIG. 2b, the occupancy level of the second FIFO ring memory 7 is checked at regular intervals in the flowchart. During a first check 40 of the occupancy level of the second ring memory 7 it is found that the occupancy level is correctly within the permitted limits. Three times 9 bytes per millisecond, that is to say a total of 27 bytes, are therefore transmitted in the first HCI SCO data packet P4. The millisecond frame shown in FIG. 3a is generated depending on the clock rate of the external device 8, that is to say of the USB master. Said clock rate is independent of the clock rate of the Bluetooth interface, that is to say the two clock rates are mutually asynchronous. As a result, despite the Bluetooth interface and the USB interface having nominally the same user data rate, the occupancy level of the second ring memory 7 decreases or increases over time. If the clock rate of the Bluetooth interface is slightly higher than the clock rate of the USB interface, the occupancy level of the ring memory 7 decreases over time. In the opposite case, the occupancy level of the ring memory 7 increases over time. In the present case, during the second check 41 of the occupancy level the baseband circuit 5 finds that the occupancy level is too high, that is to say is outside the permitted limits. The baseband circuit 5 responds to this by instructing the external device 8 by means of a corresponding HCI+ event 43 to transfer fewer than the nominal 24 bytes user data over the USB interface in the next HCI SCO data packet P4. The second packet P4 therefore has a total length of 26 bytes (23 bytes user data), with firstly 8 bytes and then two times 9 bytes total data per millisecond being transmitted during the transmission of the second HCI SCO data packet P4. During the third check 42 of the occupancy level the baseband circuit 5 again finds that the occupancy level is again correctly within the permitted limits. This is because, for a brief period during the transmission of the second packet P4, less user data was transmitted over the USB interface and consequently read into the second ring memory 7 than was transmitted by the Bluetooth interface and read out of the second ring memory 7 during this period. The initially too high occupancy level of the second ring memory 7 was thus reduced. The third packet P6 is therefore again transmitted with the nominal total length of 27 bytes. FIG. 3b shows a flowchart of the method if a given occupancy level of the FIFO ring memory 7 is not attained, the conditions being otherwise identical to those in FIG. 3a. The elements in the drawings according to FIG. 3a and FIG. 3b having the same reference symbols correspond to one another. In contrast to the sequence in FIG. 3a, during the second check 41 of the occupancy level of the first ring memory 6 it is found that the occupancy level is too low here. The baseband circuit 5 responds to this by instructing the external device 8 by means of a corresponding HCI+ event 43 to transfer more than the nominal 24 bytes user data over the USB interface in the next HCI SCO data packet P4. The second packet P4 therefore has a total length of 28 bytes (23 bytes user data), with firstly 10 bytes and then two times 9 bytes total data per millisecond being transmitted during the transmission of the second HCI SCO data packet P4. During the third check 42 of the occupancy level the baseband circuit 5 again finds that the occupancy level is again correctly within the permitted limits. This is because, for a brief period during the transmission of the second packet P4, more user data was transmitted over the USB interface and consequently read into the second ring memory 7 than was transmitted by the Bluetooth interface and read out of the second ring memory 7 during this period. The initially too low occupancy level of the second ring memory 7 was thus increased. The third packet P6 is therefore again transmitted with the nominal total length of 27 bytes.

As already described several times above, despite the data rate adaptation according to one embodiment the asynchronous differential clock pulse has an effect at the end points or starting points of a transmission chain, that is to say at the external device 8. The procedure is nevertheless advantageous for two reasons:

1. The data transmitted or to be transmitted need not necessarily be synchronous data, even if the transmission takes place over a synchronous channel. If the data is not synchronous data, an external device that processes the data is not forced to process the data at its own clock rate. For example it is conceivable for asynchronous data to be transmitted over a synchronous channel in order to comply with a certain quality-of-service (QoS) requirement. Another example of the transmission of data that is actually asynchronous is the transmission of data in a WAV file. If the external device 8 is, for example, a laptop or PC which is transmitting the stored digital data of a WAV file of a piece of music via a USB dongle having Bluetooth functionality to a Bluetooth-enabled wireless headset, the external device 8 can be instructed to adapt the data rate of the USB interface in accordance with the data rate of the Bluetooth interface without causing any problems.

2. Even if the data to be transmitted is synchronous data, the data for an external device 8 is always not transparent, that is to say appropriate measures can be taken there to compensate the asynchronous differential clock pulse. For instance, an interpolation of the data can be performed in the device 8.

What is claimed is:

1. A method for differential clock pulse compensation between a clock-pulse system of a digital line-connected data interface and an asynchronous clock-pulse system of a digital wireless data interface, wherein user data which is sent over the wireless data interface in a synchronous mode of the wireless data interface is transmitted over the line-connected data interface in a packet-based manner, the method comprising the steps of:

(1) monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and (2) adapting the data rate of the data transmitted over the line-connected data interface depending on the occupancy level of the memory, in that the number of data elements in a data packet transmitted over the line-connected data interface is increased if the occupancy level is below a permitted limit, and the number of data elements in a data packet transmitted over the line-connected data interface is reduced if the occupancy level is above a permitted limit.

2. A method according to claim 1, wherein the method step 2) comprises the following step:

sending of a first control signal depending on the occupancy level over the line-connected data interface to a data processing device connected to the radio device over the line-connected data interface, which signal instructs the data processing device to increase or to decrease the data rate of the data transmitted from the data processing device to the radio device.

3. A method according to claim 2, wherein the first control signal instructs the data processing device to increase or to decrease the number of data elements in a data packet, in particular by one data element.

4. A method for differential clock pulse compensation between a clock-pulse system of a digital line-connected data interface and an asynchronous clock-pulse system of a digital wireless data interface, wherein user data which is received over the wireless data interface in a synchronous mode of the wireless data interface is transmitted over the line-connected data interface in a packet-based manner, the method comprising the steps of:

(1) monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and (2) adapting the data rate of the data transmitted over the line-connected data interface depending on the occupancy level of the memory, in that the number of data elements in a data packet is reduced if the occupancy level is below a permitted limit, and the number of data elements in a data packet is increased if the occupancy level is above a permitted limit.

5. A method according to claim 4, wherein the method step 2) comprises the following step:

transferring a second control signal for controlling the line-connected data interface to a driver circuit on the radio device side, which signal instructs the driver circuit on the radio device side to increase or to decrease the data rate of the data transmitted from the radio device to the data processing device.

6. A method according to claim 5, wherein the second control signal instructs the driver circuit on the radio device side to increase or to decrease the number of data elements in a data packet, in particular by one data element.

7. A method according to claim 4, wherein the user data is user data about which a radio device assigned to the wireless data interface has no knowledge with respect to the information content of the user data, in particular about an encoding used for the user data.

8. A method according to claim 4, wherein the wireless data interface operates in conformity with the Bluetooth standard.

9. A method according to claim 8, wherein the first control signal is based on a Bluetooth-specific HCI event, and wherein the method step 2) comprises the following step:

sending of a first control signal depending on the occupancy level over the line-connected data interface to a data processing device connected to the radio device over the line-connected data interface, which signal instructs the data processing device to increase or to decrease the data rate of the data transmitted from the data processing device to the radio device.

10. A method according to claim 4, wherein the line-connected data interface operates in conformity with the USB standard.

11. A method according to claim 5, comprising the step:
interpolation of the data received or to be sent in the data processing device.

12. A method according to claim 1, wherein the user data is user data about which a radio device assigned to the wireless data interface has no knowledge with respect to the information content of the user data, in particular about an encoding used for the user data.

13. A method according to claim 1, wherein the wireless data interface operates in conformity with the Bluetooth standard.

14. A method according to claim 2, wherein the wireless data interface operates in conformity with the Bluetooth standard and the first control signal is based on a Bluetooth-specific HCI event.

15. A method according to claim 1, wherein the line-connected data interface operates in conformity with the USB standard.

16. A method according to claim 2, comprising the step:
interpolation of the data received or to be sent in the data processing device.

17. A system for differential clock pulse compensation comprising a clock-pulse system of a digital line-connected data interface and an asynchronous clock-pulse system of a digital wireless data interface, wherein user data which is sent over the wireless data interface in a synchronous mode of the wireless data interface is transmitted over the line-connected data interface in a packet-based manner, the system further comprising:

(1) means for monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and (2) means for adapting the data rate of the data transmitted over the line-connected data interface depending on the occupancy level of the memory, in that the number of data elements in a data packet transmitted over the line-connected data interface is increased if the occupancy level is below a permitted limit, and the number of data elements in a data packet transmitted over the line-connected data interface is reduced if the occupancy level is above a permitted limit.

18. A system according to claim 17, further comprising means for sending of a first control signal depending on the occupancy level over the line-connected data interface to a data processing device connected to the radio device over the line-connected data interface, which signal instructs the data processing device to increase or to decrease the data rate of the data transmitted from the data processing device to the radio device.

19. A system according to claim 18, wherein the first control signal instructs the data processing device to increase or to decrease the number of data elements in a data packet, in particular by one data element.

20. A system for differential clock pulse compensation comprising:
a clock-pulse system of a digital line-connected data interface;
an asynchronous clock-pulse system of a digital wireless data interface, wherein user data which is received over the wireless data interface in a synchronous mode of the wireless data interface is transmitted over the line-connected data interface in a packet-based manner;
means for monitoring the occupancy level of at least one memory arranged between the wireless data interface and the line-connected data interface, which memory admits the user data for temporary storage, and is clocked both by a clock-pulse signal of the clock-pulse system of the wireless data interface and by a clock-pulse signal of the clock-pulse system of the line-connected data interface; and
means for adapting the data rate of the data transmitted over the line-connected data interface depending on the occupancy level of the memory, in that the number of data elements in a data packet is reduced if the occupancy level is below a permitted limit, and the number of data elements in a data packet is increased if the occupancy level is above a permitted limit.

21. A system according to claim 20 wherein adapting the data rate is achieved without interpolating or removing data elements in the data packet.

22. A system according to claim 20 wherein the user data is a transparent, non-interpretable string of zeros and ones to the wireless data interface.

23. A method according to claim 1 wherein adapting the data rate is achieved without interpolating or removing data elements in the data packet.

24. A method according to claim 1 wherein the user data is a transparent, non-interpretable string of zeros and ones to the wireless data interface.

25. A method according to claim 4 wherein adapting the data rate is achieved without interpolating or removing data elements in the data packet.

26. A method according to claim 4 wherein the user data is a transparent, non-interpretable string of zeros and ones to the wireless data interface.

27. A system according to claim 17 wherein adapting the data rate is achieved without interpolating or removing data elements in the data packet.

28. A system according to claim 17 wherein the user data is a transparent, non-interpretable string of zeros and ones to the wireless data interface.

29. The method of claim 1, wherein:
a read-in clock rate of the at least one memory corresponds to the clock-pulse signal of the clock-pulse system of the line-connected data interface; and
a read-out clock rate of the at least one memory corresponds to the clock-pulse signal of the clock-pulse system of the wireless data interface.

30. The method of claim 4, wherein:
a read-in clock rate of the at least one memory corresponds to the clock-pulse signal of the clock-pulse system of the wireless data interface; and
a read-out clock rate of the at least one memory corresponds to the clock-pulse signal of the clock-pulse system of the line-connected data interface.

31. The method of claim 1, wherein:
the at least one memory comprises a first clock input to receive the clock-pulse signal of the clock-pulse system of the wireless data interface and a second clock input to receive the clock-pulse signal of the clock-pulse system of the line-connected data interface;
a read-in clock rate of the at least one memory corresponds to the clock-pulse signal received at the second clock input; and
a read-out clock rate of the at least one memory corresponds to the clock-pulse signal received at the second clock input.

32. The method of claim 4, wherein:
the at least one memory comprises a first clock input to receive the clock-pulse signal of the clock-pulse system of the line-connected data interface and a second clock input to receive the clock-pulse signal of the clock-pulse system of the wireless data interface;
a read-in clock rate of the at least one memory corresponds to the clock-pulse signal received at the second clock input; and
a read-out clock rate of the at least one memory corresponds to the clock-pulse signal received at the first clock input.

33. The method of claim 1, wherein:
the data transmitted over the line-connected data interface comprises header data and user data and the data rate is adapted by increasing or reducing the number of data elements in the user data.

34. The method of claim 4, wherein:
the data transmitted over the line-connected data interface comprises header data and user data and the data rate is adapted by increasing or reducing the number of data elements in the user data.

* * * * *